United States Patent [19]

Waclawik et al.

[11] Patent Number: 5,220,731
[45] Date of Patent: Jun. 22, 1993

[54] FRICTION DRIVE POSITION TRANSDUCER

[75] Inventors: Ronald E. Waclawik, Fairhaven, Mass.; James L. Cayer, Portsmouth; Kenneth M. LaPointe, Narragansett, both of R.I.

[73] Assignee: The United States of America as represented by the Secretary of the Navy, Washington, D.C.

[21] Appl. No.: 783,660

[22] Filed: Oct. 28, 1991

[51] Int. Cl.$^5$ .............................................. G01B 3/12
[52] U.S. Cl. ...................................... 33/773; 33/772
[58] Field of Search ............... 33/734, 735, 743, 747, 33/748, 749, 772, 773, 775, 778, 779

[56] References Cited

U.S. PATENT DOCUMENTS

| | | | |
|---|---|---|---|
| 2,706,857 | 4/1955 | Carter | 33/747 |
| 3,520,062 | 7/1970 | Tanguy | 33/734 |
| 3,740,855 | 6/1973 | Bean et al. | 33/782 |
| 3,771,703 | 11/1973 | St. Denis | 226/42 |
| 4,179,817 | 12/1979 | Lavigne et al. | 33/735 |
| 4,205,447 | 6/1980 | Smith | 33/743 |
| 4,457,071 | 7/1984 | Alphonso | 33/778 |

FOREIGN PATENT DOCUMENTS

| | | | |
|---|---|---|---|
| 0044256 | 7/1918 | Sweden | 33/748 |
| 0118982 | 9/1918 | United Kingdom | 33/734 |

*Primary Examiner*—William A. Cuchlinski, Jr.
*Assistant Examiner*—Alvin Wirthlin
*Attorney, Agent, or Firm*—Michael J. McGowan; Prithvi C. Lall; Michael F. Oglo

[57] ABSTRACT

A spring force loaded contact wheel mounted in a stationary position relative to a reciprocating shaft is disclosed. The apparatus of the present invention includes a tensioning assembly for maintaining absolute contact between the contact wheel and the reciprocating shaft wherein the tensioning assembly urges the contact wheel against the shaft to maintain contact therebetween so that the wheel turns as the shaft is linearly displaced. A rotary encoding device is coupled to the wheel for translating the angular and rotational movement thereof into an electronic signal for providing linear displacement information and derivative data with respect to displacement of the shaft. Absolute friction contact and cooperative interaction between the shaft and the contact wheel is further enhanced in the preferred embodiment by advantageously selecting the type of surface finish and the amount of surface area of the contact wheel relative to the surface condition of the shaft as well as by reducing the moment of inertia of the contact wheel.

6 Claims, 4 Drawing Sheets

FRICTION DRIVE POSITION TRANSDUCER

STATEMENT OF GOVERNMENT INTEREST

The present invention may be manufactured and used by or for the government of the United States of America for governmental purposes without the payment of any royalties thereon or therefor.

BACKGROUND OF THE INVENTION (1) Field of the Invention

The present invention relates generally to an apparatus for measuring the linear displacement of a reciprocating member and, more specifically, to a spring force loaded contact wheel device for measuring transient displacement of a linear shaft having a smooth surface.

(2) Description of Prior Art

Devices for measuring the linear displacement of a reciprocating shaft are useful in providing data for parametric testing of a Ram Pump Ejection System (RPES) used in launching torpedoes or other devices from a submarine or other marine vessel. A typical RPES includes a shaft having a piston mounted at each end thereof, each piston being housed in a separate cylinder wherein shaft seals maintain an isolated environment for each cylinder as the shaft travels laterally therethrough. In operation, a first piston of the RPES is pneumatically driven through its stroke by a pulse of high pressure air, creating a force against the connecting shaft, which, in turn, drives the second piston through its stroke. The second piston is located in a hydraulic environment such that the stroke thereof generates a hydraulic impulse for launching the weapon or other device. In the RPES described hereinabove, the pistons and the associated connecting shaft travel over a fixed stroke in a transient manner. Each piston is located in a limited access environment such that measurement of the displacement thereof is limited to the environment outside of each cylinder along the exposed portion of the shaft. The method presently employed for collecting linear displacement data in an RPES involves the application of coded information directly onto the shaft for detection by an optical sensing device. However, it has been found that this coded information tends to wear off quickly as the shaft travels through the shaft seals and also gives rise to undue wear on the shaft seals such that periodic maintenance, requiring time consuming disassembly of the RPES is required. Further, the present method used for collecting displacement data cannot be readily applied to shipboard system evaluations and is therefore limited in its application to use at launch system test facilities such as one that simulates an RPES on a 688 class submarine. The present invention contemplates the use of a contact wheel and associated rotary encoding device to measure linear displacement of a shaft. Since an RPES involves a shaft connecting two pistons which are necessarily located in pressure sensitive cylinders, the connecting shaft between the two pistons must translate through multiple sets of seals, thereby necessitating that the shaft have a very smooth surface. Further, since at least one end of the shaft travels through a hydraulic environment, the shaft is often wet and slippery. These restrictions tend to create difficulty in maintaining absolute non-slip, friction contact between a contact wheel and the reciprocating member which can yield erroneous displacement measurements. The present invention provides a novel friction drive apparatus for measuring linear displacement of a smooth reciprocating shaft.

SUMMARY OF THE INVENTION

The present invention provides a friction drive position transducer including a spring force loaded contact wheel mounted in a stationary position relative to a smooth reciprocating shaft. The apparatus includes a tensioning assembly for maintaining absolute contact between the contact wheel and the reciprocating shaft by urging the contact wheel against the shaft. The tensioning assembly maintains constant contact between the contact wheel and the shaft so that the wheel turns faultlessly as the shaft is displaced linearly. The contact wheel is coupled to an encoding device which translates the angular and rotational movement of the wheel into an electronic signal for providing linear displacement data and derivative information such as velocity and acceleration data with respect to the linear displacement of the shaft. Faultless operation of the measuring device described hereinabove is dependent upon the constant maintenance of absolute friction contact between the contact wheel and the shaft so that efficient cooperation therebetween is achieved. In the presently preferred embodiment, absolute friction contact is provided by a spring force applied to the contact wheel via a tensioning assembly. Further, the surface finish and surface area of the wheel relative to the surface condition of the shaft, and the moment of inertia of the contact wheel are selected to enhance the performance of the present friction drive position transducer.

DESCRIPTION OF THE DRAWINGS

The present invention may be more fully understood from the following detailed description, taken in conjunction with the accompanying drawings, wherein.

DESCRIPTION OF THE PREFERRED EMBODIMENT

Figure 1:
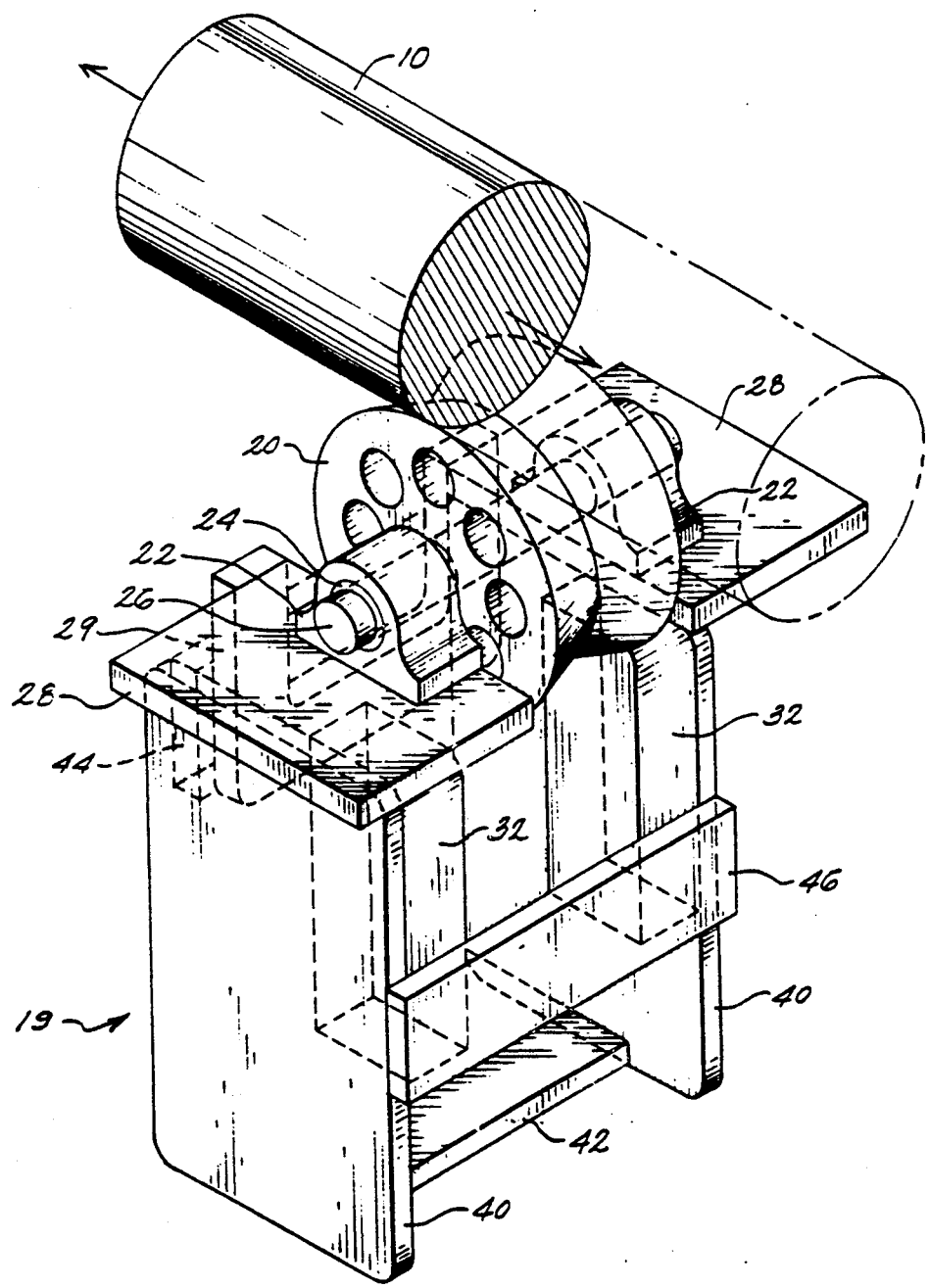
FIG. 1 is a perspective view of the friction drive position transducer of the present invention.
Figure 2:
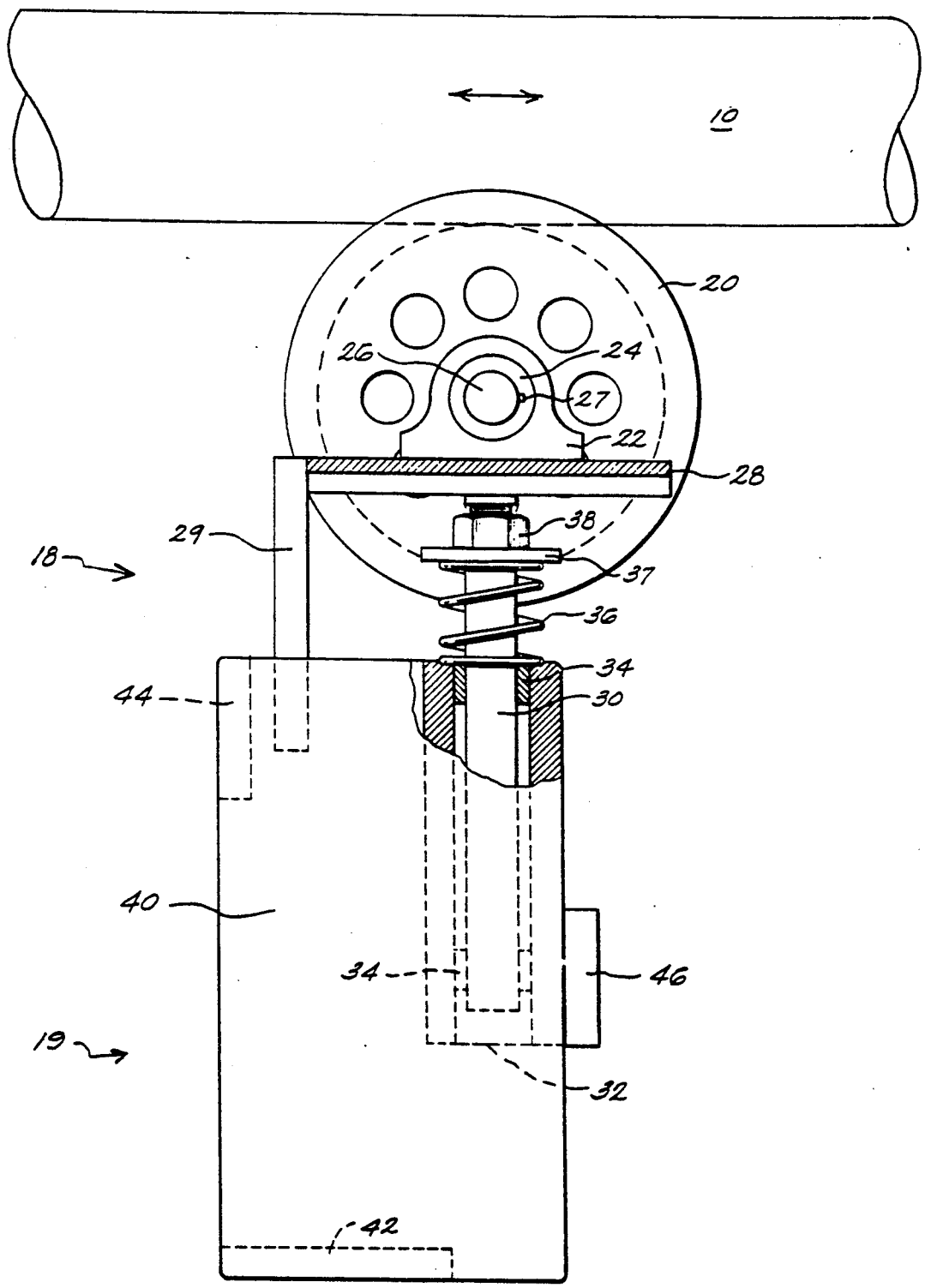
FIG. 2 is a side view of the friction drive position transducer of the present invention.
Figure 3:
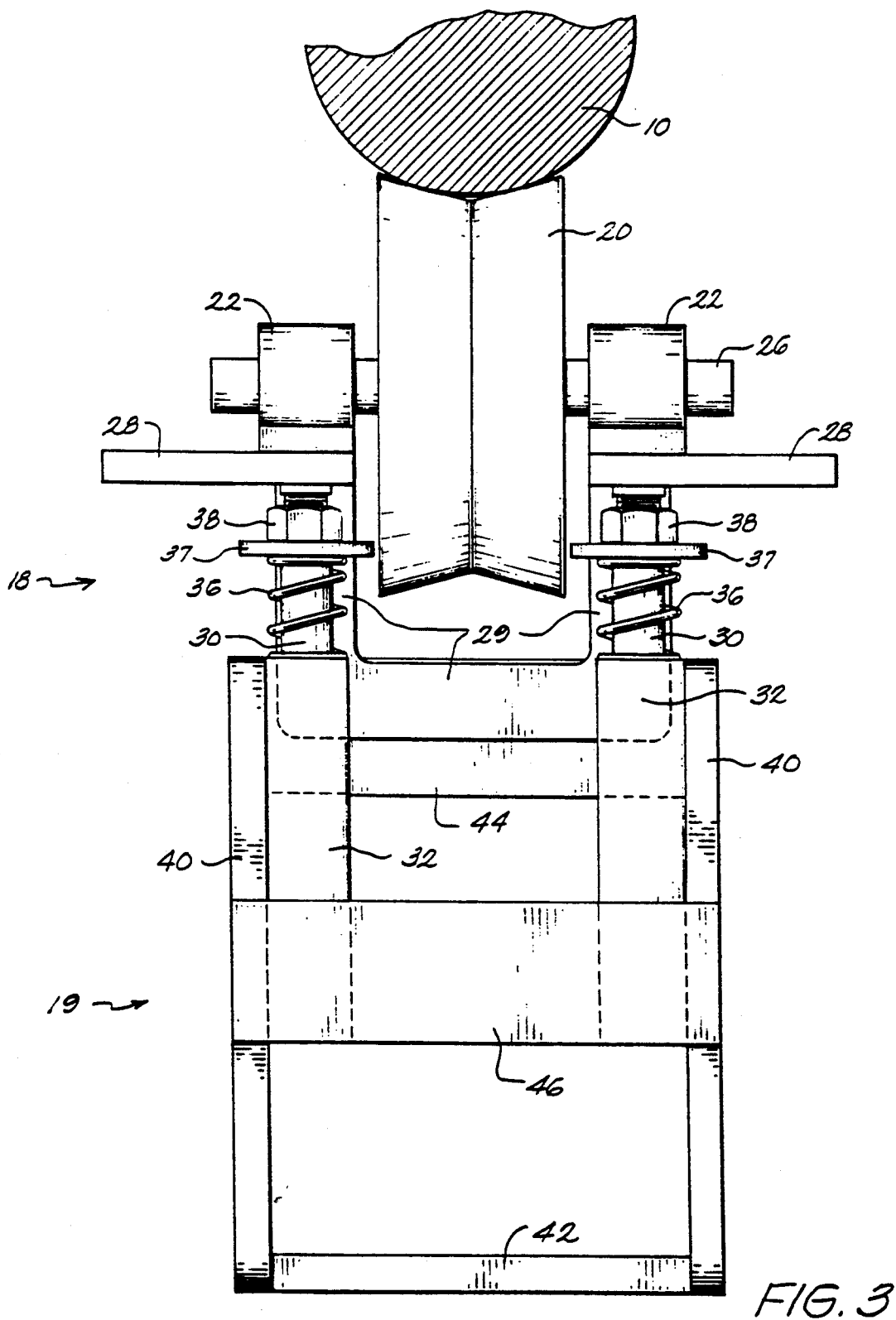
FIG. 3 is a front view of the friction drive position transducer of the present invention.

Referring now to FIGS. 1-3, wherein like numerals represent corresponding or similar elements throughout the several views, there is shown an exemplary embodiment of a friction drive position transducer according to the present invention. The present invention discloses a contact wheel 20 mounted on a tensioning assembly 18 and a cooperative support assembly 19 for urging the contact wheel 20 against a smooth reciprocating shaft 10. The invention provides means for transducing linear displacement of the shaft 10 into rotational movement of the wheel 20 wherein rotational movement data is converted into an electronic signal which can be analyzed to provide linear displacement information as well as derivative information such as velocity and acceleration.

Figure 4:
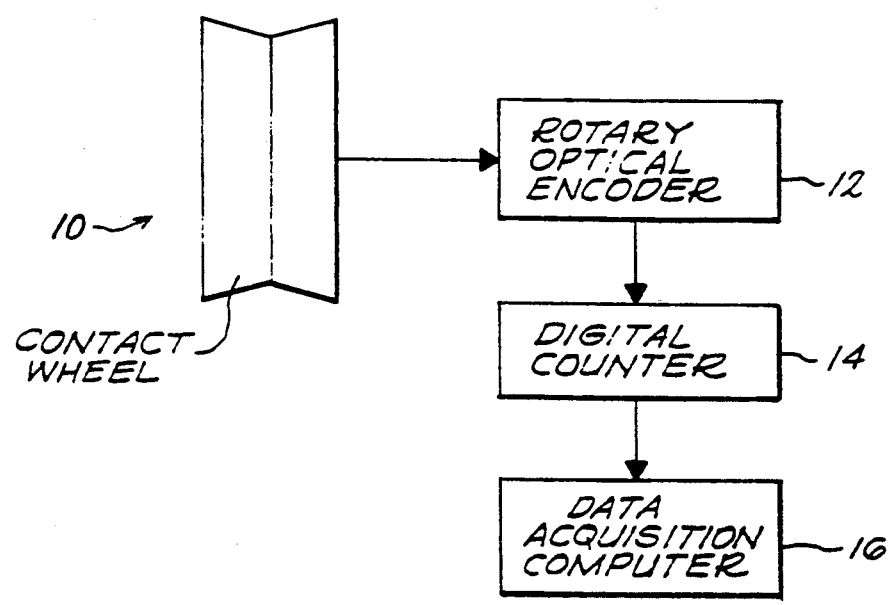
FIG. 4 illustrates a schematic block diagram of the friction drive position transducer of the present invention.

In the preferred embodiment of the invention, the tensioning assembly 18 includes a pair of pillow blocks 22 located o either side of the contact wheel 20. Each pillow block 22 is aligned along the central axis of the wheel 20 for receiving the ends of a wheel shaft 26. The wheel 20 and wheel shaft 26 are keyed to rotate as a unit by means of a suitable keying arrangement 27. The pillow blocks 22 include self-aligning bearings 24, providing effortless uniform rotational movement of the shaft 2 therein for accommodating non-axial movement of the shaft 10 despite minor flaws in the uniform linearity thereof. Each pillow block 22 is mounted on an instrument support plate 28 extending from a connector plate 29. The connector plate 29 is mounted on the support assembly 19 which, in conjunction with the instrument support plates 28, provide a flexible stage for proper configuration of the contact wheel. The instrument support plates 28 and the contact wheel 20 are further supported by slidable shafts 30 mounted to each instrument support plate 28, subjacent to each pillow block 22 and opposite the connector plate 29. Each slidable shaft 30 is in turn spring-mounted into a respective orifice in a support block 32 on support assembly 19 wherein a spring 36 creates an opposing force between the support block 32 and the pillow block 22 to urge the wheel 20 against the reciprocating shaft 10. The receiving orifice of each bearing support block 32 includes bearings 34 for providing dynamic support to each slidable shaft 30. The end of each slidable shaft 30 adjacent to the instrument plate 28 is provided with screw threads for receiving an adjusting nut 38 and a cooperative washer 37 for adjusting the tension in spring 36. The support assembly 19 provides a mounting foundation for the tensioning assembly 18 described hereinabove. The support assembly 19 includes a pair of opposing side plates 40 configured to form a rigid frame via aft cross plate 44 and forward cross plate 46. The support assembly 19 can be mounted in a stationary position relative to the reciprocating shaft via a clamp plate 42. The tensioning and support assemblies 18, 19 are further coupled together via the connector plate 29 mounted across the side plates 40 adjacent to the aft cross plate 44 of the support assembly 19. In operation, the friction drive position transducer of the present invention is mounted in a fixed position relative to a linearly reciprocating shaft 10, wherein the tensioning assembly 18 is put into compression against the shaft 10 by means of the springs 36 in cooperation with adjusting nuts 38. As the shaft 10 is translated through its stroke, the contact wheel 20 is maintained in non-slip contact with the shaft 10 at a known radius, thereby rotating at a rate proportional to the displacement of the shaft 10. As shown in FIG. 4, the contact wheel 20 is coupled to an optical rotary encoder 12 or other means for generating an electrical signal representative of angular and rotational movement. This signal is transmitted to a digital counter 14 for providing discrete data points to a data collection computer 16, where the signal is monitored and analyzed to provide accurate displacement, velocity and acceleration history of the stroke of shaft 10. The present invention eliminates slippage between the shaft 10 and contact wheel 20 by using the tensioning apparatus 18 to urge the contact wheel 20 against the linear shaft 10, thereby maintaining non-slip contact therebetween. Thus, the shaft 10 and wheel 20 are maintained in constant contact wherein slippage therebetween is substantially eliminated so that accurate determination of speed, acceleration and displacement can be achieved during transient motion of the shaft 10. In the exemplary embodiment, the shaft 10 has a three inch diameter, is extended thirteen and one-half feet, and, under typical conditions, travels its length in approximately eight-tenths of a second. It has been found that providing the tensioning assembly with 75-200 pounds of force yields optimum results with respect to wheel/shaft contact and cooperation.

The friction coupling between the contact wheel 20 and shaft 10 is further enhanced to eliminate slippage therebetween by increasing the amount of contact surface between the contact wheel 20 and the linear shaft 10. To this end, a V-shaped groove is provided along the outside diameter of the contact wheel to produce greater contact surface area between the shaft 10 and wheel 20. The V-shaped groove eliminates slippage and is cooperative with the self-aligning bearings 24 to maintain the wheel 20 and shaft 10 in relative alignment. It will be appreciated by those of skill in the art that the angle of the V-groove can be varied or the shape thereof can be modified depending on the particular applications environment.

Cooperative interaction between the shaft 10 and wheel 20 is further enhanced by casting a surface coating material on the outside diameter of the contact wheel 20 to provide a non-slip, friction-bearing surface thereon. In the preferred embodiment, a Shore A 60 Urethane finish was cast onto the contact surface of the wheel 20 to provide a relatively soft surface coating thereon. This surface coating effectively grasps the linear shaft 10 as the shaft is linearly displaced in order to prevent the shaft 10 from gliding along the surface of the contact wheel 20. Operational effectiveness of the position transducer of the present invention is further enhanced by reducing the moment of inertia of the wheel 20. Thus, by reducing the weight of the wheel 20, the effects of the wheel's momentum as the wheel 20 rotates is reduced so that the wheel 20 is truly cooperative with the shaft 10. The moment of inertia can be advantageously reduced by fabricating the wheel 20 from a material having a relatively high weight to strength ratio, such as aluminum, and/or by removing a portion of the mass of the wheel in symmetry with the axis of rotation thereof, as shown in the contact wheel 20 of FIGS. 1-3. It should be noted that the choice of materials and the amount of mass that can be removed for reducing the moment of inertia of the wheel 20 is limited by the constraint that the wheel 20 must not deform during high-velocity transient movement of the shaft 10.

The present invention has a relatively small size and robust construction which makes it portable and adaptable to systems outside the laboratory environment such that the tensioning and support assemblies 18, 19, the encoder 12, and the electronics associated therewith can be integrated into a single portable unit which can be used for shipboard evaluations. A variety of modifications and variations of the present invention are possible in light of the above teachings. For example, an application is foreseen wherein two opposing wheels would be used in order to create a force balance on the shaft. It is therefor to be understood that the present invention may be practiced within the scope of the appended claims otherwise than as specifically described hereinabove. Thus, the invention is not to be limited by what has been particularly shown and described, except as indicated by the appended claims.

What is claimed is:

1. A friction drive position transducer for measuring linear displacement of a linear, reciprocating shaft, comprising:
   a contact wheel having a shaft;
   a support assembly;

a split platform mounted on said support assembly;

said split platform further comprising a U-shaped arm having first and second upstanding legs and a connecting web coupled to a first end of each of said first and second upstanding legs wherein said web spaces said first upstanding leg and said second upstanding leg by a predetermined distance;

said split platform still further comprising a first platform portion having first and second opposing surfaces, said first platform portion coupled to a second end of the first upstanding leg;

said split platform yet further comprising a second platform portion having first and second opposing surfaces, said second platform portion coupled to a second end of the second upstanding leg, wherein said web both holds said first and second platform portions together and defines a wheel receiving well;

first and second bearing assemblies each of said bearing assemblies respectively mounted to the first surface of a corresponding one of said first and second platform portions and wherein said contact wheel shaft is rotatably mounted such that said contact wheel extends in said well defined by said U-shaped arm and is supported by said split platform;

first and second tensioning assemblies each of said first and second tensioning assemblies respectively mounted between the second surface of a corresponding one of said first and second platform portions and said support assembly such that each include a linear bearing that allows the corresponding split platform portion and therewith the wheel to linearly translate with respect to said support assembly and a spring that acts against the support assembly and urges the corresponding split platform portion to translate along the corresponding linear bearing and therewith moves the wheel into contact with said shaft;

means coupled to said contact wheel for providing an output signal representative of angular and rotational motion of said contact wheel; and means responsive to said output signal for providing displacement data relative to the linear displacement of the shaft.

2. The friction drive position transducer of claim 1, wherein said contact wheel includes a non-slip surface coating material for providing a friction-bearing surface between said contact wheel and the shaft.

3. The friction drive position transducer of claim 2, wherein said non-slip surface coating material is a urethane based coating material.

4. The friction drive position transducer of claim 3 wherein said contact wheel is so constructed and arranged to exhibit a moment of inertia sufficiently low and the surface of the urethane base coating material on the contact wheel sufficiently soft to provide non-slip interaction between said contact wheel and said reciprocating shaft.

5. The friction drive position transducer of claim 4, wherein said contact wheel is fabricated of comparatively low moment of inertia aluminum material and has axially extending mass lightening openings between its side faces, said openings being located in a symmetrical pattern about the wheel axis of rotation.

6. The friction drive position transducer of claim 4, wherein said construction and arrangement causing the wheel to exhibit said predetermined moment of inertia providing means includes:

a plurality of holes axially extending through the contact wheel symmetrically disposed about the center of said contact wheel.

* * * * *